United States Patent
Kister et al.

(10) Patent No.: US 7,155,725 B1
(45) Date of Patent: Dec. 26, 2006

(54) APPARATUS AND METHOD FOR COORDINATING MULTIPLE E-MAIL ACCOUNTS

(75) Inventors: Scott Kister, Woodside, CA (US); Christopher Joseph DeSalvo, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 453 days.

(21) Appl. No.: 10/109,182

(22) Filed: Mar. 27, 2002

(51) Int. Cl.
*G06F 3/00* (2006.01)

(52) U.S. Cl. ..................................................... 719/310
(58) Field of Classification Search ............. 379/88.17; 355/46; 709/204, 313; 719/310
See application file for complete search history.

(56) References Cited

U.S. PATENT DOCUMENTS

| | | | |
|---|---|---|---|
| 5,126,786 A * | 6/1992 | Tanaka | ........................ 355/46 |
| 5,159,592 A | 10/1992 | Perkins | |
| 5,436,960 A | 7/1995 | Campana, Jr. et al. | |
| 5,559,800 A | 9/1996 | Mousseau et al. | |
| 5,594,910 A | 1/1997 | Filepp et al. | |
| 5,625,670 A | 4/1997 | Campana, Jr. et al. | |
| 5,631,946 A | 5/1997 | Campana, Jr. et al. | |
| 5,715,387 A | 2/1998 | Barnstijn et al. | |
| 5,727,202 A | 3/1998 | Kucala | |
| 5,778,176 A | 7/1998 | Geihs et al. | |
| 5,790,974 A | 8/1998 | Tognazzini | |
| 5,802,312 A | 9/1998 | Lazaridis et al. | |
| 5,819,172 A | 10/1998 | Campana, Jr. et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,104 A | 3/2000 | Zahariev | |
| 6,035,339 A | 3/2000 | Agraharam et al. | |
| 6,067,451 A | 5/2000 | Campana, Jr. et al. | |
| 6,076,109 A | 6/2000 | Kikinis | |
| 6,151,677 A | 11/2000 | Walter et al. | |
| 6,157,935 A | 12/2000 | Tran et al. | |

(Continued)

FOREIGN PATENT DOCUMENTS

WO   WO 98/36344   8/1998

(Continued)

OTHER PUBLICATIONS

Meggers, J., et al., "A multimedia communicaiton archtecture for handhelf devices," Personal Indoor and Mobile Radio Communications, 1998. Sep. 8-11, 1998, IEEE, pp. 3 double-sided.

(Continued)

*Primary Examiner*—William Thomson
*Assistant Examiner*—LeChi Truong
(74) *Attorney, Agent, or Firm*—Blakely, Sokoloff, Taylor & Zafman, LLP (57) ABSTRACT

A method for coordinating messages between an internal e-mail account and an external e-mail account is described comprising: retrieving specified e-mail messages from the external e-mail account and storing the messages in the internal e-mail account; mapping internal identification ("ID") codes assigned to the e-mail messages by the internal e-mail account to external ID codes assigned to the e-mail messages by the external e-mail account; detecting that an operation has been performed on a particular e-mail message on the internal account; determining an external ID code for the particular message based on the mapping; and transmitting an update to update the external account, the update including the external ID code to identify the particular e-mail message and an indication of the operation performed in the internal account.

29 Claims, 5 Drawing Sheets

U.S. PATENT DOCUMENTS

| | | | |
|---|---|---|---|
| 6,166,734 | A | 12/2000 | Nahi et al. |
| 6,167,441 | A | 12/2000 | Himmel |
| 6,199,099 | B1 | 3/2001 | Gershman et al. |
| 6,233,318 | B1* | 5/2001 | Picard et al. ............ 379/88.17 |
| 6,289,212 | B1 | 9/2001 | Stein et al. |
| 6,317,592 | B1 | 11/2001 | Campana, Jr. et al. |
| 6,330,618 | B1 | 12/2001 | Hawkins et al. |
| 6,370,687 | B1 | 4/2002 | Shimura |
| 6,396,482 | B1 | 5/2002 | Griffin et al. |
| 6,418,310 | B1 | 7/2002 | Dent |
| 6,622,175 | B1 | 9/2003 | Piller |
| 2001/0056508 | A1 | 12/2001 | Ameson et al. |
| 2002/0083035 | A1 | 6/2002 | Pearl et al. |
| 2003/0055902 | A1* | 3/2003 | Amir et al. ................. 709/206 |

FOREIGN PATENT DOCUMENTS

| | | |
|---|---|---|
| WO | WO 99/06929 | 2/1999 |
| WO | WO 00/30003 | 5/2000 |

OTHER PUBLICATIONS

Bergzen H, "Project Status And System Archteichtrue Of An Automated HF System To Be Used By The Swedish Armed Forces," Oct. 28, 2001 IEEE Military Commuinications Conference, pp. 4 doublesided.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

Excite Home Page, http://www.excite.com/, 1 page Aug. 1, 2000.

Yahoo Home Page, http://www.yahoo.com/, 1 page Aug. 1, 2000.

Alta Vista Home Page, http://www.altavista.com/, 1 page Aug. 1, 2000.

Anita Komlodi, Key Frame Preview Techniques For Video Browsing, Digital Library Research Group, College of Library and Information Services University of Maryland, pp. 118.

Appenzeller, et al.., "User-friendly Access Control For Public Network Ports", IEEE, pp. 699-707, Mar. 1999.

* cited by examiner

Internal to External Message ID Mapping

| Internal Server (IMAP) Message ID Codes | External Server (POP) Message ID Codes |
|---|---|
| Folder=inbox, uid = 3361 | B881431776693cca7e41ccded0f56610 (msg no 1) |
| Folder=inbox, uid = 3362 | B881431776693cca7e41ccded0f56611 (msg no 2) |
| Folder=inbox, uid = 3363 | B881431776693cca7e41ccded0f56612 (msg no 3) |
| Folder=saved mail, uid = 3361 | B881431776693cca7e41ccded0f56613 (msg no 4) |
| Folder=saved mail, uid = 3362 | B881431776693cca7e41ccded0f56614 (msg no 5) |
| Folder=inbox, uid = 3364 | B881431776693cca7e41ccded0f56615 (msg no 6) |
| Folder=inbox, uid = 3365 | B881431776693cca7e41ccded0f56616 (msg no 7) |

GID to Standard IMAP ID Code Mapping

| GID Codes | Standard IMAP ID Codes |
|---|---|
| 0000000001 | Folder=inbox, uid = 3361 |
| 0000000002 | Folder=inbox, uid = 3362 |
| 0000000003 | Folder=inbox, uid = 3363 |
| 0000000004 | Folder=saved mail, uid = 3361 |
| 0000000005 | Folder=saved mail, uid = 3362 |
| 0000000006 | Folder=inbox, uid = 3364 |
| 0000000007 | Folder=inbox, uid = 3365 |

*Fig. 5*

APPARATUS AND METHOD FOR COORDINATING MULTIPLE E-MAIL ACCOUNTS

BACKGROUND OF THE INVENTION

1. Field of the Invention

This invention relates generally to the field of data processing systems. More particularly, the invention relates to an improved apparatus and method for coordinating messages from a plurality of email accounts.

2. Description of the Related Art

E-mail has become an irreplaceable tool in today's business environment. Virtually all corporate employees rely on e-mail in one way or another to communicate both externally with customers and internally with other employees. In addition, most e-mail users have at least one personal e-mail account. The personal e-mail account may be provided by the user's Internet Service Provider (e.g., Pacific Bell, AT&T Worldnet,™ America Online,™ . . . etc), or by an Internet Web site (e.g., Yahoo™ Mail or Hotmail™).

One problem which exists with this scenario is that users may find it difficult to coordinate among a plurality of different e-mail accounts. For example, while a user may check his/her corporate e-mail account throughout the day while at work, the user may not remember to, or may not be able to, check his/her personal e-mail account. Similarly, while at home in the evening or on weekends, the user may only have access to his/her personal e-mail account. Thus, if the user sends an e-mail from his/her personal account to a business associate, the user may not be able to review the business associate's reply until the user returns home and logs in to his/her personal e-mail account. Conversely, if the user sends an e-mail from his/her corporate account to a friend, the user may not be able to access the friend's reply until the user returns to work and logs in to his/her personal e-mail account. Even if a user is able to access both e-mail accounts from the same location, requiring the user to log into two or more different e-mail systems is somewhat burdensome, particularly when two or more different user agents may be required on the user's desktop computer and/or wireless client (e.g., Microsoft Outlook™ and Lotus Notes™).

The foregoing problem is further exacerbated by the fact that many e-mail systems work with different, incompatible e-mail standards. The two most common e-mail standards are the Post Office Protocol 3 ("POP3") and the Internet Messaging Access Protocol ("IMAP").

POP3 is commonly used for Internet e-mail accounts. A POP3 server temporarily stores incoming e-mail messages until they are downloaded by a logged in user. The user may configure the server to either delete the e-mail messages as soon as they are downloaded or wait until the user indicates that they should be deleted. POP3 is a relatively simple protocol with limited configurable options. All pending messages and attachments are downloaded from a single e-mail folder on the server to a single e-mail folder on the user's client computer or wireless device (i.e., the user agent's "Inbox"). Messages are identified based on a unique message identification code.

IMAP is another common, and somewhat more sophisticated, e-mail standard which is widely used for both Internet e-mail accounts and corporate e-mail accounts. IMAP4 is the latest version. Unlike POP3, it provides a message database in which messages can be archived in folders (e.g., inbox, sent mail, saved mail, . . . etc) and e-mailboxes that can be shared between users. IMAP also provides improved integration with Multipurpose Internet Mail Extensions ("MIME"), the protocol used to attach files to e-mail messages (e.g., users can read only message headers without having to automatically accept and wait for the attached files to download).

SUMMARY

A method for coordinating messages between an internal e-mail account and an external e-mail account is described comprising: retrieving specified e-mail messages from the external e-mail account and storing the messages in the internal e-mail account; mapping internal identification ("ID") codes assigned to the e-mail messages by the internal e-mail account to external ID codes assigned to the e-mail messages by the external e-mail account; detecting that an operation has been performed on a particular e-mail message on the internal account; determining an external ID code for the particular message based on the mapping; and transmitting an update to update the external account, the update including the external ID code to identify the particular e-mail message and an indication of the operation performed in the internal account.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for coordinating between a plurality of e-mail accounts. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
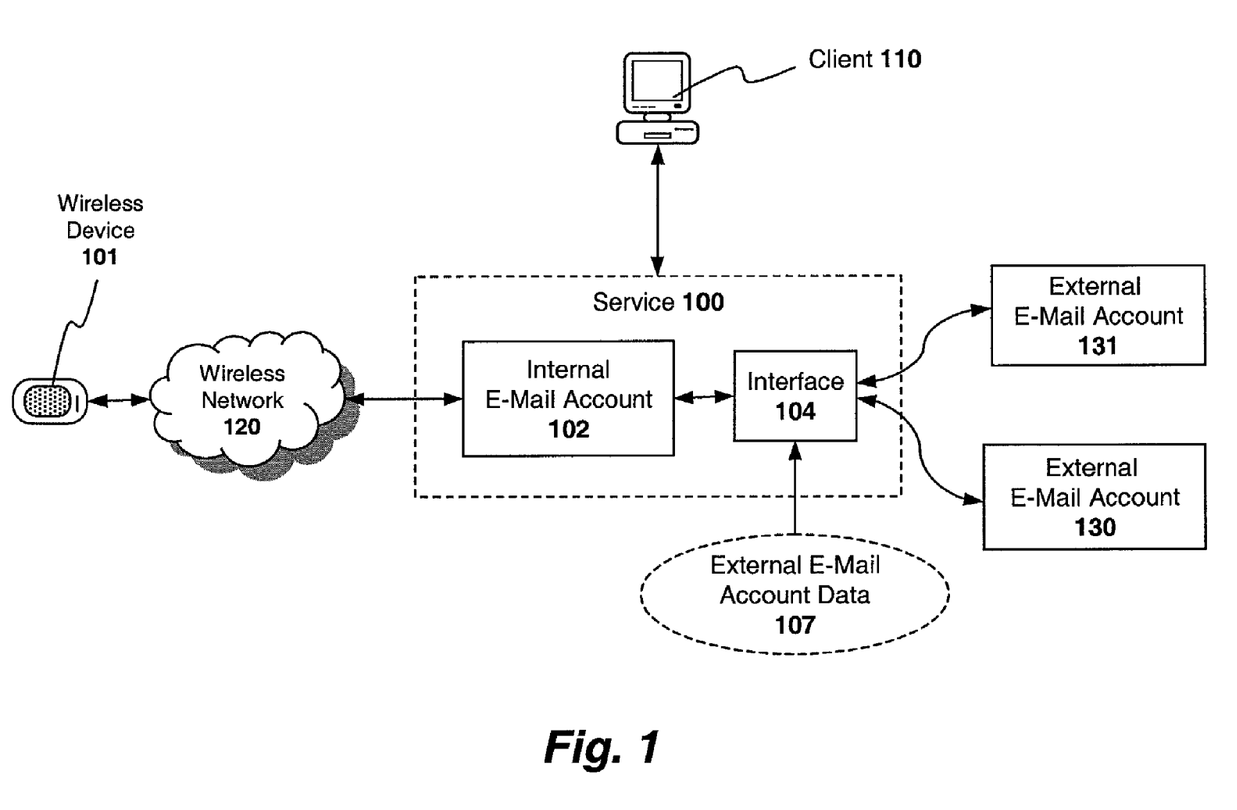
FIG. 1 illustrates an e-mail system architecture according to one embodiment of the invention.

Embodiments of the invention may be implemented on a data processing service 100 such as that illustrated generally in FIG. 1. In one embodiment, the service 100 acts as a proxy between a wireless data processing device 101 and any external servers with which the wireless device 101 communicates such as, for example, e-mail servers 130 and 131 and Web servers (not shown). For example, standard applications, multimedia content and data may be converted by the service 100 into a format which the wireless device 101 can properly interpret. One embodiment of a service 100 is described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference.

According to the embodiment illustrated in FIG. 1, a user is provided with an internal e-mail account 102 on the service 100 (e.g., maintained on one or more e-mail servers). As used herein, "internal" refers to the fact that the e-mail account is maintained and controlled by the service 100. The user may access the internal e-mail account 102 to send and receive e-mail messages from the user's wireless device 101 over a wireless network 120 and/or from a client computer 110 (e.g., a personal computer communicatively coupled to the Internet). Various network types may be employed including, for example, those that support Cellular Digital Packet Data ("CDPD") and Mobitex. It should be noted, however, that the underlying principles of the invention are not limited to any particular type of wireless network 120.

In addition to the internal e-mail account 102, the user may have various "external" e-mail accounts 130 and 131, i.e., "external" in the sense that they are not maintained or controlled directly by the service 100. As described above, in prior systems, the user would typically be required to log in separately to each of the individual e-mail accounts 102, 130 and 131. By contrast, in one embodiment of the invention, the service 100 automatically retrieves messages from the user's external accounts 130 and 131 and store the messages within the user's internal e-mail account 102. Thus, the user may access all of his/her messages from a single account 102 and using a single user agent.

In the embodiment illustrated in FIG. 1, an interface 104 configured on the service 100 periodically queries the external e-mail accounts 130 and 131 to check for new messages. Alternatively, or in addition, the interface 104 may retrieve messages from the external accounts 130 and 131 only after receiving a command from the user, or each time the user logs in to the internal e-mail account 102. In one embodiment, the user may configure the external e-mail accounts 130, 131 to automatically transmit new e-mail messages to the interface 104 as they are received.

Before the interface 104 can retrieve messages from the external e-mail accounts 130, 131, it must initially be programmed with the network addresses of the servers for each account (e.g., mail.pacbell.net) and valid user authentication data. For example, the external e-mail accounts 130, 131 will typically require a valid user name and password before providing e-mail messages to the interface 104. Accordingly, as indicated in FIG. 1, the user may initially be required to provide the interface with external e-mail account data 107.

Once e-mail messages from the external e-mail accounts 130, 131 have been stored within the internal e-mail account 102, the user may perform various e-mail operations on them (e.g., reply to, delete, move to saved mail folder, . . . etc) just as if they were initially addressed to the internal account 102. In addition, in one embodiment, the interface 104 will transmit mail account updates to the external e-mail accounts 130, 131. For example, when a user deletes a particular message, an indication that the message was deleted will be transmitted to the external accounts 130, 131, thereby maintaining message consistency among the various e-mail accounts. In one embodiment, the choice as to whether operations on internal accounts 102 should be reflected on external accounts 130, 131, may be made by the user on an account-by-account basis.

Figure 2:
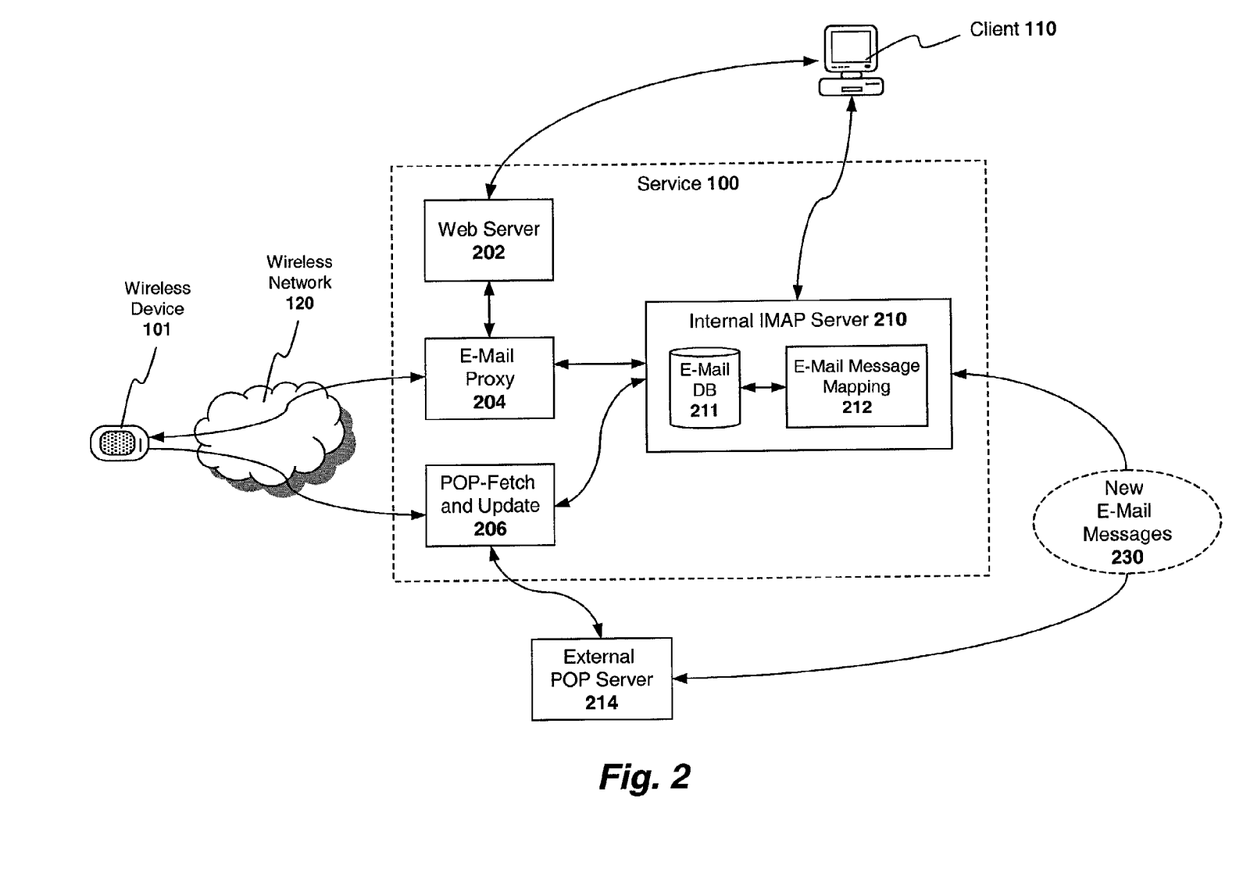
FIG. 2 illustrates a more specific embodiment of the invention which includes an internal IMAP account and an external POP account.

One particular embodiment for coordinating e-mail messages between an internal e-mail account which employs the IMAP protocol (e.g., IMAP4) and an external account which employs the POP3 protocol is illustrated in FIG. 2. Although this embodiment will be described with reference to these two particular protocols, it should be noted that the underlying principles of the invention may be implemented using a variety of alternate messaging protocols (e.g., the Distributed Mail System Protocol ("DMSP"), X.400 . . . etc).

In this embodiment, a POP Fetch/Update interface 206 is configured on the service 100 to fetch e-mail messages from one or more external POP servers 214. As described above, the POP Fetch/Update interface 206 may be programmed to periodically (e.g., every 15 minutes) check for new e-mail messages 230 on the external POP account 214. In addition, the user may command the POP Fetch/Update interface 206 to check for new messages at any given time, from either the wireless device 101 or the client computer 110.

Regardless of how the POP Fetch/Update interface 206 is triggered to check for new messages, once it is, it will initially transmit authentication data to the external POP account 214 such as, for example, the user's e-mail account name and password. Once the authentication data is accepted by the external POP account 214, the POP account 214 transmits any new e-mail messages to the POP Fetch/Update interface 206. In one embodiment, the POP protocol is used to transmit files from the POP account 214 to the POP Fetch/Update interface 206. However, the underlying principles of the invention are not limited to any message transmission protocol.

Depending on how the user's external POP account is configured, the messages transmitted to the POP Fetch/Update interface 206 may either be automatically deleted from the external account 214 as soon as they are transmitted, or maintained on the external account 214 until the user subsequently indicates that the messages should be deleted.

In one embodiment, the POP Fetch/Update interface 206 transfers the new e-mail messages to a specified folder on the internal IMAP account 210. For example, if the user has a Yahoo e-mail account and a Worldnet e-mail account, the user may set up two independent folders on the internal IMAP account 210 (e.g., "Yahoo Mail" and "Worldnet Mail," respectively) to store new e-mail messages from both accounts (as mentioned above, IMAP provides support for e-mail message folders).

Figure 3:
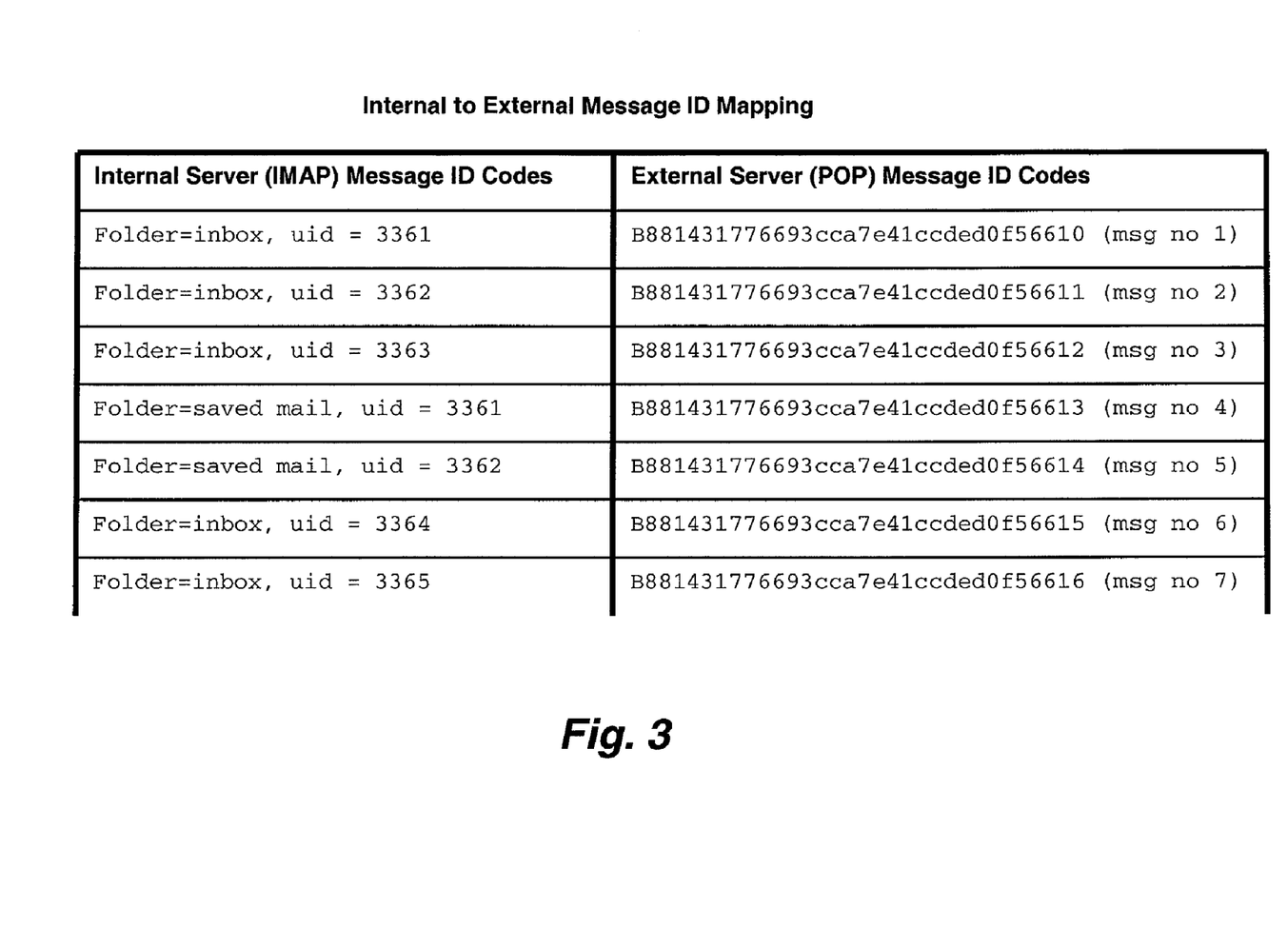
FIG. 3 illustrates a mapping of internal account codes with external account codes according to one embodiment of the invention.

If the external POP account 214 is configured to store e-mail messages even after the messages have been retrieved, then two copies of each message will exist following retrieval: one copy on the external account 214 and one copy on the internal e-mail database 211. As such, to provide for greater coordination between the two accounts, in one embodiment, e-mail message mapping logic 212 generates a link between the messages stored on the internal account 210 and the external account 214. For example, a table such as the one illustrated in FIG. 3 may be generated by the e-mail message mapping logic 212 to map internal e-mail message identification codes 301 with external e-mail message identification codes 302. In operation, each time the user performs an operation with respect to a particular internal e-mail message, the e-mail message mapping logic 212 will determine whether a corresponding external e-mail message exists. If so, it will notify the POP Fetch/Update interface 206, which will subsequently update the external POP account 214 accordingly.

For example, referring again to FIG. 3, if the user deletes a message with internal message ID code "folder=saved mail, uid=3361," the e-mail message mapping logic 212 will indicate to the POP Fetch/Update interface 206 that external message number 4, with external message ID code "B881431776693 cca7e41 ccded 0f56613" should be deleted from the external POP server 214. The POP Fetch/Update interface 206 will then transmit a POP3 "delete" command to the external POP account 214, identifying the message using the message number (e.g., "DELE 4"). In this way, the user can effectively manage several different mail accounts from a single account.

The user may access the internal e-mail account 210 from his/her wireless device 101 which, in one embodiment, connects to the account via an e-mail proxy 204. As described in the Network Portal Application, in one embodiment, the e-mail proxy 204 uniquely formats e-mail messages and other content (e.g., Web pages, graphical images, etc) based on the capabilities of the particular wireless device 101. The user may also access the internal e-mail account 210 via a client desktop or notebook computer 110, either directly or through a Web interface 202 (e.g., such as the Web interfaces provided by Yahoo Mail and Hotmail).

Figure 4:
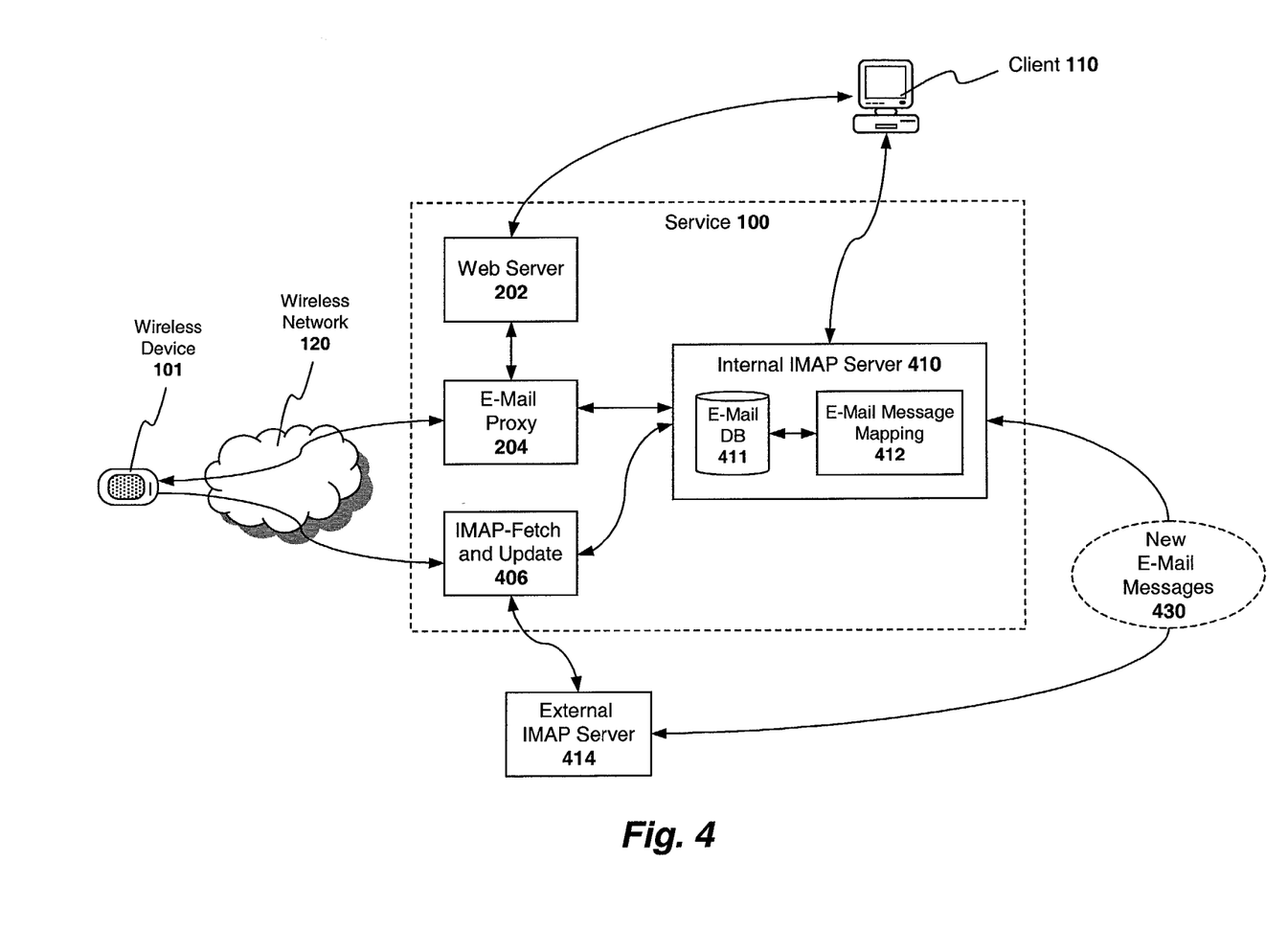
FIG. 4 illustrates one embodiment of an e-mail system in which both the internal and external account are IMAP accounts.

FIG. 4 illustrates an embodiment in which both the internal e-mail account 410 and the external e-mail account 414 are IMAP accounts. Because the external IMAP account 414 will have support for e-mail folders, various levels of e-mail coordination are possible. For example, the user may configure the IMAP Fetch/Update Interface 406 to retrieve messages only found in specified folders on the external e-mail account 414 (e.g., just from the "inbox" folder). Once specific folders have been identified by the user, the internal account 410 may retrieve messages from the external account 414 in a similar manner as described above. For example, once the messages are retrieved from the external account 414, e-mail message mapping logic 412 executed within the internal account 410 will associate each external message ID code with an internal message ID code (e.g., as illustrated generally in FIG. 3). The association may then be used to transmit message updates to the remote account 414. For example, when the user deletes a message, the e-mail message mapping logic 412 will determine if a corresponding external message exists (e.g., by performing a table lookup using the internal message ID code). If so, the e-mail message mapping logic 412 will transmit the external ID code to the IMAP Fetch/Update Interface 406 which will subsequently transmit a "delete" command to the external IMAP account 414 (i.e., identifying the message to be deleted by the external ID code).

One additional problem when working with internal and/or external IMAP accounts is that e-mail message ID codes are only unique within each individual IMAP folder. For example, both the "inbox" folder and the "saved mail" folder may contain e-mail messages with ID codes ranging from 1 through 20 (i.e., the same ID codes are used for different e-mail messages). In addition, when an e-mail message is moved from a source folder to a destination folder, it is provided with a new ID code (i.e., based on the ID codes used for messages already stored in the folder). As a result, some mechanism must be provided in order to maintain an accurate mapping between messages stored on the internal e-mail account 210, 410 and the external e-mail account 214, 414.

Figure 5:
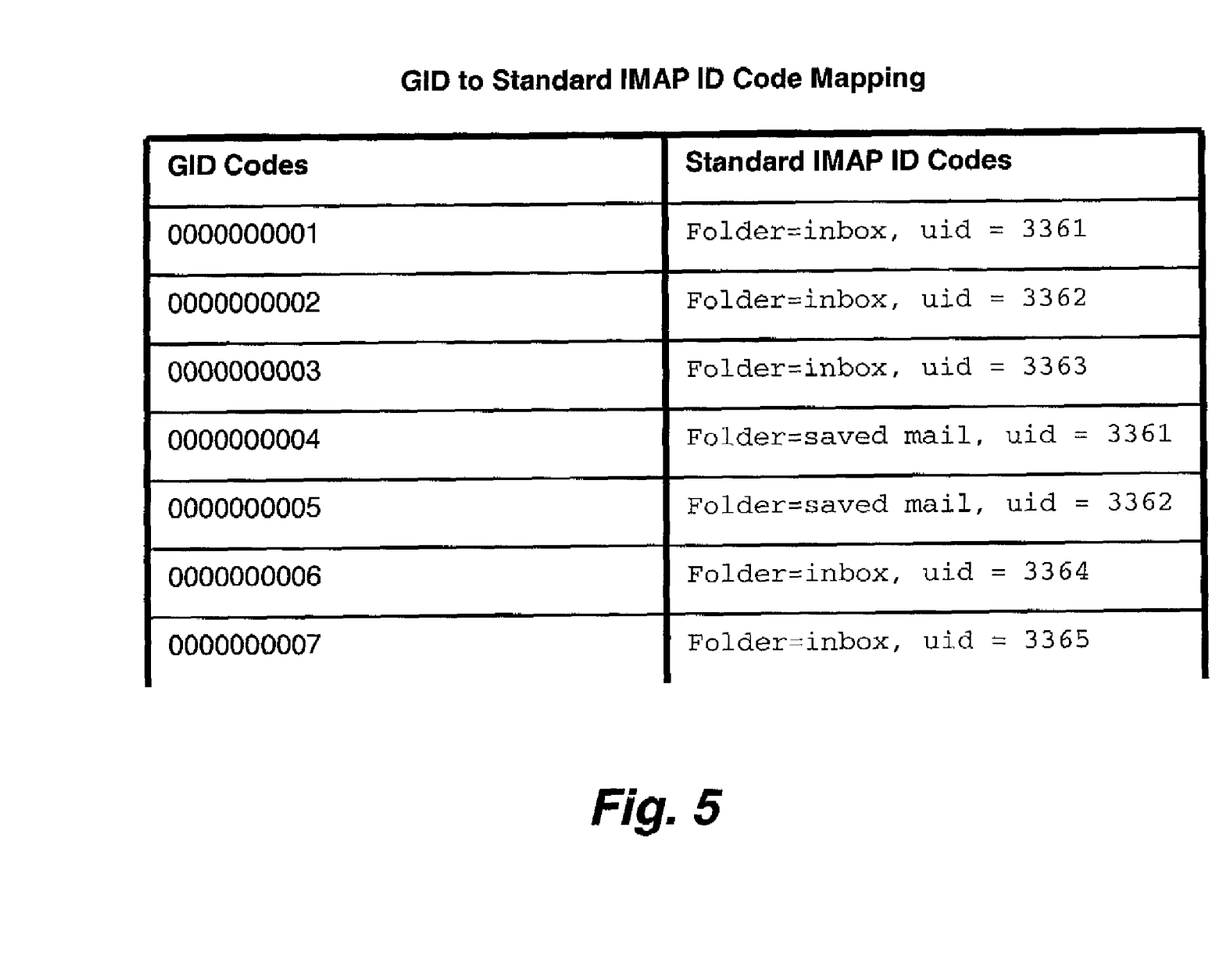
FIG. 5 illustrates a mapping of global identification codes ("GIDs") to standard IMAP identification codes according to one embodiment of the invention.

In one embodiment of the invention, in order to accurately track messages across IMAP folders, a unique global ID code ("GID") is generated for all messages on the IMAP account 210, 410. Unlike standard IMAP identification codes, a message's GID uniquely identifies that message on the account 210, 410, and will not change as the message is moved from one folder to the next. The table in FIG. 5 sets forth an exemplary mapping of GIDs to standard IMAP ID codes. In one embodiment, the e-mail message mapping logic 212, 412 associates each e-mail message's GID with a corresponding ID code on the remote account. As a result, when a user moves a file from one folder to another at the internal account 210, 410, the corresponding message on the external account 214, 414 may still be identified.

GIDs may be generated and maintained in several different ways. In one embodiment, whenever an update to a particular message is made, the GID mapping is updated. For example if GID=20 corresponds to INBOX:25 and the user moves INBOX:25 to Trash:12, the mapping us updated accordingly. One advantage of this technique is that it enables quick lookups of messages by GIDs.

In another embodiment, an X-Header such as X-GID: 20 is inserted into the actual header of the mail message. If the message is moved, the header moves with it. One advantage of this technique is that less work is required to track the message from one folder to the next.

In one embodiment, when a user responds to an e-mail message from the internal account 210, 410, the "FROM:" field in the header will indicate the original account to which the message was transmitted. For example, if the message was originally sent to the external account 214, 414, then the "FROM:" field will include the external account address, notwithstanding the fact that the reply is generated at the internal account.

In addition, an indication that the message was transmitted from the internal account may also be included in the message. For example, when the message is transmitted from the wireless device an indication that the message was send from a "Wireless" device may be appended to the sender's name (e.g., "Scott Kister (wireless)" scott.kister@danger.com), thereby identifying the true origin of the message while, at the same time, maintaining the original e-mail recipient address. In one embodiment, this indication may be enabled or disabled at the internal account 210, 410 by the end user.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while embodiments of the invention are described above in the context of IMAP and POP, the underlying principles of the invention may be employed using a variety of alternate protocols, both on the internal account and the external account. Accordingly, the scope and spirit of the invention should be judged in terms of the claims which follow.

What is claimed is:

1. A method for coordinating messages between an internal e-mail account of a service and an external e-mail account comprising:
retrieving specified e-mail messages from said external e-mail account and storing a copy of said messages in said internal e-mail account, wherein:
said internal e-mail account is maintained and controlled directly by said service;
said internal e-mail account is configured to send and/or receive e-mail message updates to/from a plurality of external e-mail accounts; and
said external e-mail account is not maintained and controlled directly by said service;
mapping internal identification ("ID") codes assigned to said e-mail messages by said internal e-mail account to external ID codes assigned to said e-mail messages by said external e-mail account;
detecting that an operation has been performed on a particular e-mail message on said internal account;
determining an external ID code for said particular message based on said mapping; and
transmitting an update to update said external account, said update including said external ID code to identify said particular e-mail message and an indication of said operation performed in said internal account;
wherein mapping further comprises:
storing said internal ID codes assigned to said e-mail messages by said internal e-mail account in a table with said external ID codes assigned to said e-mail messages by said external e-mail account, wherein each row of said table has one internal ID code and one external ID code associated with said internal ID code.

2. The method as in claim 1 wherein said operation is a deletion of said particular e-mail message and wherein in response to said deletion on said internal account, said message is deleted from said external account.

3. The method as in claim 1 wherein said internal account operates according to the Internet Messaging Access Protocol ("IMAP") standard and wherein said external account operates according to the Post Office Protocol ("POP") standard.

4. The method as in claim 3 wherein said IMAP standard is IMAP4 and said POP standard is POP3.

5. The method as in claim 1 wherein both said internal and said external accounts operate according to the IMAP standard.

6. The method as in claim 1 wherein both said internal and said external accounts operate according to the POP standard.

7. The method as in claim 1 further comprising:
generating a global ID code ("GID") for messages stored on said internal account, said GID consistently and uniquely identifying messages on said internal account, regardless of whether said messages are moved from a first message folder to a second message folder.

8. The method as in claim 7 wherein mapping comprises mapping said GID for each of said messages on said internal account with corresponding message ID codes on said external account.

9. The method as in claim 1 further comprising:
generating an external message folder on said internal account for storing said messages retrieved from said external account; and
storing said messages retrieved from said external account in said external message folder.

10. A system for coordinating messages between an internal e-mail account of a service and an external e-mail account comprising:
message fetch and update logic to retrieve specified e-mail messages from said external e-mail account and store a copy of said messages in said internal e-mail account, wherein:
said internal e-mail account is controlled by said service;
said internal e-mail account is configured to send and/or receive e-mail message updates to/from a plurality of external e-mail accounts; and
said external e-mail account is not maintained and controlled directly by said service;
message mapping logic to map internal identification ("ID") codes assigned to said e-mail messages by said internal e-mail account to external ID codes assigned to said e-mail messages by said external e-mail account; and
in response to detecting that an operation has been performed on a particular e-mail message on said internal account, said message fetch and update logic to identify an external ID code for said particular message based on said mapping, and to transmit an update to update said external account, said update including said external ID code to identify said particular e-mail message and an indication of said operation performed in said internal account;
wherein mapping further comprises:
storing said internal ID codes assigned to said e-mail messages by said internal e-mail account in a table with said external ID codes assigned to said e-mail messages by said external e-mail account, wherein each row of said table has one internal ID code and one external ID code associated with said internal ID code.

11. The system as in claim 10 wherein said operation is a deletion of said particular e-mail message and wherein in response to said deletion on said internal account, said message is deleted from said external account.

12. The system as in claim 10 wherein said internal account operates according to the Internet Messaging Access Protocol ("IMAP") standard and wherein said external account operates according to the Post Office Protocol ("POP") standard.

13. The system as in claim 12 wherein said IMAP standard is IMAP4 and said POP standard is POP3.

14. The system as in claim 10 wherein both said internal and said external accounts operate according to the IMAP standard.

15. The system as in claim 10 wherein both said internal and said external accounts operate according to the POP standard.

16. The system as in claim 10 wherein said message mapping logic additionally:
stores said internal ID codes assigned to said e-mail messages by said internal e-mail account in a table with said external ID codes assigned to said e-mail messages by said external e-mail account, wherein each row of said table has one internal ID code and one external ID code associated with said internal ID code.

17. The system as in claim 10 wherein said internal account generates a global ID code ("GID") for messages stored on said internal account, said GID consistently and uniquely identifying messages on said internal account, regardless of whether said messages are moved from a first message folder to a second message folder.

18. The system as in claim 17 wherein said message mapping logic maps said GID for each of said messages on said internal account with corresponding message ID codes on said external account.

19. The system as in claim 10 wherein said message fetch and update logic stores messages retrieved from said external account in an external message folder opened on said internal account.

20. An article of manufacture including program code which, when executed by a machine, cause said machine to perform the operations of:
retrieving specified e-mail messages from an external e-mail account and storing a copy of said messages in an internal e-mail account of a service, wherein:
said internal e-mail account is controlled by said service; and
said internal e-mail account is configured to send and/or receive e-mail message updates to/from a plurality of external e-mail accounts;
said external e-mail account is not maintained and controlled directly by said service;
mapping internal identification ("ID") codes assigned to said e-mail messages by said internal e-mail account to external ID codes assigned to said e-mail messages by said external e-mail account;
detecting that an operation has been performed on a particular e-mail message on said internal account;
determining an external ID code for said particular message based on said mapping; and
transmitting an update to update said external account, said update including said external ID code to identify said particular e-mail message and an indication of said operation performed in said internal account;
wherein mapping further comprises:
storing said internal ID codes assigned to said e-mail messages by said internal e-mail account in a table with said external ID codes assigned to said e-mail messages by said external e-mail account, wherein each row of said table has one internal ID code and one external ID code associated with said internal ID code.

21. The article of manufacture as in claim 20 wherein said operation is a deletion of said particular e-mail message and wherein in response to said deletion on said internal account, said message is deleted from said external account.

22. The article of manufacture as in claim 20 wherein said internal account operates according to the Internet Messaging Access Protocol ("IMAP") standard and wherein said external account operates according to the Post Office Protocol ("POP") standard.

23. The article of manufacture as in claim 22 wherein said IMAP standard is IMAP4 and said POP standard is POP3.

24. The article of manufacture as in claim 20 wherein both said internal and said external accounts operate according to the IMAP standard.

25. The article of manufacture as in claim 20 wherein both said internal and said external accounts operate according to the POP standard.

26. The article of manufacture as in claim 20 wherein mapping further comprises:
storing said internal ID codes assigned to said e-mail messages by said internal e-mail account in a table with said external ID codes assigned to said e-mail messages by said external e-mail account, wherein each row of said table has one internal ID code and one external ID code associated with said internal ID code.

27. The article of manufacture as in claim 20 including additional program code to cause said machine to perform the operations of:
generating a global ID code ("GID") for messages stored on said internal account, said GID consistently and uniquely identifying messages on said internal account, regardless of whether said messages are moved from a first message folder to a second message folder.

28. The article of manufacture as in claim 27 wherein mapping comprises mapping said GID for each of said messages on said internal account with corresponding message ID codes on said external account.

29. The article of manufacture as in claim 20 including additional program code to cause said machine to perform the operations of:
generating an external message folder on said internal account for storing said messages retrieved from said external account; and
storing said messages retrieved from said external account in said external message folder.

* * * * *